(12) United States Patent
Carpenter et al.

(10) Patent No.: US 6,868,401 B1
(45) Date of Patent: Mar. 15, 2005

(54) TRANSACTION PROCESSING SYSTEM TO FACILITATE THE COMMERCIAL SUPPORT ACTIVITIES ASSOCIATED WITH THE BUYING AND SELLING OF COMMODITY PRODUCTS

(75) Inventors: Kevin W. Carpenter, Houston, TX (US); Orville J. Wiens, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 379 days.

(21) Appl. No.: 09/693,275

(22) Filed: Oct. 19, 2000

(51) Int. Cl.$^7$ ............................................. G06F 17/60
(52) U.S. Cl. ....................................................... 705/37
(58) Field of Search ..................................... 705/24–40

(56) References Cited

U.S. PATENT DOCUMENTS

| | | | | |
|---|---|---|---|---|
| 4,677,552 | A | | 6/1987 | Sibley, Jr. ................... 364/408 |
| 5,237,495 | A | | 8/1993 | Morii .......................... 364/401 |
| 5,253,165 | A | | 10/1993 | Leiseca et al. .............. 364/407 |
| 5,297,031 | A | | 3/1994 | Gutterman et al. ......... 364/408 |
| 5,592,375 | A | | 1/1997 | Salmon et al. .............. 395/207 |
| 5,717,989 | A | * | 2/1998 | Tozzoli et al. ................. 705/37 |
| 5,873,071 | A | | 2/1999 | Ferstenberg et al. .......... 705/37 |
| 5,910,896 | A | * | 6/1999 | Hahn-Carlson .............. 705/35 |
| 6,055,519 | A | | 4/2000 | Kennedy et al. .............. 705/80 |
| 6,115,698 | A | | 9/2000 | Tuck et al. .................... 705/37 |
| 6,125,391 | A | | 9/2000 | Meltzer et al. ............. 709/223 |
| 6,151,588 | A | * | 11/2000 | Tozzoli et al. ................ 705/37 |
| 6,167,378 | A | * | 12/2000 | Webber et al. ................ 705/35 |
| 6,317,729 | B1 | * | 11/2001 | Camp et al. ................... 705/39 |
| 6,430,496 | B1 | * | 8/2002 | Smith et al. ................... 705/37 |

FOREIGN PATENT DOCUMENTS

WO     WO 97/04410     * 2/1997

OTHER PUBLICATIONS

McDonald, Soybean Digest, Magazine/Journal; trade, Jun. 2000, Dialog file 636, Accession No. 04736240.*

Altra Corporate—Jan. 30, 2001, Altra Reports Record–Breaking Year, http://www.ui.com/browse.php/pr_013001/, Apr. 5, 2001, 5 pages.

Altra Tools—Product List, http://www.ui.com/browse.php/product_list/, Apr. 5, 2001, 2 pages.

Altra Corporate—Jul. 20, 2000, Conoco Invests in Altra Energy Technologies for Natural Gas, Power Trading, http://www.ui.com/browse.php/072000/, Apr. 5, 2001, 3 pages.

Altra Corporate—Apr. 4, 2001, Altra® Teams with TIBCO Software to Provide Integration Capabilities for New Energy E–Commerce Initiative, http://www.ui.com/browse.php/pr_040401, Apr. 5, 2001, 5 pages.

(List continued on next page.)

*Primary Examiner*—Frantzy Poinvil
(74) *Attorney, Agent, or Firm*—David Hitchcock

(57) ABSTRACT

A transaction processing system facilitates the buying and selling of commodity products by establishing a single documentary record for the transaction, requiring approval of variables introduced into the transaction. The parties register and agree to a standard contract of terms. For each transaction, the unique data for that transaction is entered by the parties and then must be affirmatively approved. Next, a schedule for delivery of the product is developed in conjunction with an overall schedule for product delivery for all of the current transactions. After the product is delivered, a product delivery report is provided from the delivery asset specifying the volume of the product, its composition, and shipment. This information, in conjunction with the transaction contract, are utilized to produce invoicing data. The parties must affirmatively approve the invoicing data prior to the production of payment statements by the system.

30 Claims, 5 Drawing Sheets

OTHER PUBLICATIONS

Altra Corporate—Jan. 22, 2001, Altra Sets New NGL Record on Trading Exchange, http://www.ui.com/browse.php/pr__012201/, Apr. 5, 2001, 3 pages.

Altra Services—FAQ, http://www.ui.com/browse.php/services_faq/, Apr. 5, 2001, 7 pages.

Altra Corporate—May 19, 1999, Altra Merges Electronic Trading Platforms, http://www.ui.com/browse.php/pr__051999, Apr. 5, 2001, 3 pages.

Altra Corporate—Apr. 16, 1999, Altra'Altrade Crude/NGL Announces Reocrd Trading Day, http://www.ui.com/browse.php/pr__041699, Apr. 5, 2001, 3 pages.

Altra Corporate—Apr. 6, 1999, Solarc and Altra to Link Energy Trading Tools, http://www.ui.com/browse.php/pr__040699, Apr. 5, 2001, 3 pages.

Altra Corporate—Feb. 1, 1999, Electronic Gas Trading Hits Record Daily Volume, http://www.ui.com/browse.php/pr__020199, Apr. 5, 2001, 2 pages.

Altra Corporate—Sep. 26, 1996, Altra Energy Technolgies Powers up Website, http://www.ui.com/browse.php/pr__09261996, Apr. 5, 2001, 2 pages.

Altra Corporate, Altra's Streamline Announces Two New Trading Locations, http://www.ui.com/browse.php/pr__012197/, Apr. 5, 2001, 3 pages.

Altra Corporate—Oct. 18, 1999, Altrade, Amerex And Prebon Energy Launch Online Power Trading Exchange Alliance, Creating Heightened E–Commerce Trading Liquidity, http://www.ui.com/browse.php/pr__101899., Apr. 5, 2001, 5 pages.

Dialog Search regarding Redmeteor.com, 3 pages.

Dialog Search regarding Brentbroker.com, 3 pages.

Dialog Search regarding American Petroleum Exchange, 2 pages.

Dialog Search regarding HoustonStreet, 5 pages.

Dialog Search regarding Pepex, 1 page.

Dialog Search regarding Oilspace, 1 page.

Dialog Search regarding Intercontinental Exchange (ICE), 4 pages.

FuelSpot.com Closes Venture Funding; Zero Stage Capital Leads Multi–Million Dollar Investment, http://www.prnewswire.com, Apr. 9, 2001, 2 pages.

FuelSpot to Integrate Back–office Functionality Into Energy Products Trade and Exchange Platform, http://www.prnewswire.com, Apr. 9, 2001, 2 pages.

FuelSpot and AXXIS Petroleum Merge to Provide Market–leading Web–Enabled Fuel Pricing and Trading Services, http://www.prnewswire.com, Apr. 9, 2001, 2 pages.

FuelSpot Launches Electronic Trade and Exchange Platform For Petroleum Industry; Secures $21 Million in Capital, http://www.prnewswire.com, Apr. 9, 2001, 2 pages.

FuelSpot Adds New Service for Suppliers of Refined Petroleum Products, http://www.prnewswire.com, Apr. 9, 2001, 2 pages.

Dialog Search regarding Fuel Quest/Oil Spot, 2 pages.

PetroVangage, Our Solution, http://www.petrovantage.com/solutions.html, Apr. 6, 2001, 3 pages.

PetroVantage, Press Release, Aspen Technology Launches PetroVantage—the First Collaborative Digital Marketplace or the Petroleum Industry, http://www.petrovantage.com/PressNotes.html, Apr. 6, 2001, 3 pages.

Energy Network, PetroVantage to Tackle Oil Supply Chain, Jan. 2, 1001, by Jeff Gosmano, 1 page.

PetroVantage, Business Benefits, Delivering Lasting Economic Value, http://www.petrovantage.com/business.html, Apr. 6, 2001, 2 pages.

PetroVantage, The Petroleum Industry, http://www.petrovantage.com/industry.html, Apr. 6, 2001, 2 pages.

Dialog Search regarding PetroVantage, 6 pages.

TradeCapture B2B Exchange Tools, http://www.tradecapture.com/site/prod__exch__main.html, Apr. 6, 2001, 7 pages.

Dialog Search regarding TradeCapture, 1 page.

NetworkOil—About Us, http://www.networkoil.com/aboutus/, Apr. 9, 2001, 2 pages.

NetworkOil—Why Use NetworkOil, http://www.networkoil.com/aboutus/why/, Apr. 9, 2001, 2 pages.

About EnergyPortal, http://www.energyportal.com/about/index.html, Apr. 9, 2001, 2 pages.

http://www.energyportal.com/about/faq.htm, Apr. 9, 2001, 4 pages.

Press Release, May 16, 2000—ADB Systems, Inc. and EnergyPortal.Com Announce Strategic Alliance to Streamline Oil and Gas Procurement Services, http://www.energyportal.com/about/pressrelease051600.htm, Apr. 9, 2001, 2 pages.

Dialog Search for PetroCosm, 2 pages.

Dialog Search for EnronOnline, 10 pages.

Altra Market Place—eLiquids, http://www.ui.com/browse.php/ngl__crude/, Apr. 5, 2001, 3 pages.

Altra Tools—End to End, http://www.ui.com/browse.php/end__to __end/, Apr. 5, 2001, 2 pages.

Altra Corporate—Jul. 2, 1998, Altra's Transaction Management Systems Selected By PacifiCorp and Tractebel, http://www.ui.com/browse.php/pr__07021998/, Apr. 5, 2001, 3 pages.

Altra Market Place—eGas, http://www.altra.com/browse.php/gas/, Apr. 5, 2001, 3 pages.

Solarc RightAngle Software Adds Portfolio Analysis, Risk Managment Tools to its Leading Trade Management Solution, Tulsa, Oklahoma (Oct. 27, 2000), http://www.solarc.com/press/pressrelease.asp?ID=55, Apr. 9, 2001, 2 pages.

Welcome to SolArc, Right Angle™, http://www.solarc.com/rightangle/content.html, Apr. 9, 2001, 2 pages.

Dialog Search for SAP, 2 pages.

Tempest 2000®—physical and derivative trade processing for the global crude oil, petroleum, product, fuel oil, petrochemical and natural gas liquids markets, http://www.savantsoftware.com/tem2000.html, Apr. 9, 2001, 3 pages.

Tempest Trader ™—real–time position management and mark–to–market P/L reporting for oil traders http://www.savantsoftware.com/temtrad.html, Apr. 9, 2001, 2 pages.

Tempest Enterprise™—a customizable transaction processing and global communications software platform for large–scale, high–volume commodity trading enterprise deployments, http://www.savantsoftware.com/tement.html, Apr. 9, 2001, 1 page.

Tango™—an integrated front–, middle– and back–office trading solution designed for small–to mid–sized commodity trading companies, http://www.savantsoftware.com/tango.html, Apr. 9, 2001, 2 pages.

Solarc Introduces i.Link for Integrated Back–End Enterprise–to–Enterprise Trade Management Data Sharing, Tulsa, Oklahoma (Dec. 14, 2000), http://www.solarc.com/press/pressrelease.asp?ID=56, Apr. 9, 2001, 2 pages.

Inventory Management Project . . . Addressing Customer Concern, Nov. 11–13, 1996, 20 pages.

SAP® Oil & Gas—Supply Chain Planning and Optimization for the Petroleum Industry, Copyright 2000 SAP AG, http://www.sap.com, pp. 1–16.

Williams W. Hargrove et al., "Supercomputer", *Scientific American,* Aug. 2001, 2 cover pages and pp. 74–79.

Atscon–Infosys–FEA Risk Management Installation for CONOCO, Houston, Texas, Exhibit 1, 1 page.

SolArc.—Putting Enterprise Trade Management At Your Fingertips, "Company", Tulsa, Oklahoma, http://www.solarc.com/company/company_main.htm, Apr. 27, 2001, 1 page.

SolArc: Product, "Solutions", Tulsa, Oklahoma, http://www.solarc.com/product/product_main.htm, Apr. 27, 2001, 1 page.

Allegro Development, e–solutions for the energy industry, *industry leadership,* http://www.allegrodevelopment.com/about/indleader.htm, Apr. 10, 2001, 3 pages.

Allegro Development, e–solutions for the energy industry, *product integration,* "Allegro Crude Oil", http://www.allegrodevelopment.com/products/crudeoil.htm, Apr. 10, 2001, 3 pages.

Allegro Development, e–solutions for the energy industry, *product integration,* "Allegro Refined Products", http://www.allegrodevelopment.com/products/refined products.htm, Apr. 10, 2001, 3 pages.

Allegro Development, e–solutions for the energy industry, *product integration,* "Allegro Natural Gas Liquids", http://www.allegrodevelopment.com/products/ NHLs.htm, Apr. 10, 2001, 3 pages.

Allegro Development, e–solutions for the energy industry, *product integration,* "Allegro Risk Management", http://www.allegrodevelopment.com/products/riskmgmt.htm, Apr. 10, 2001, 4 pages.

Caminus—Your Competitive Edge in Energy, "Risk Management System", http://www.caminus.com/products/corporateenergy.html, May 1, 2001, 2 pages.

* cited by examiner

TRANSACTION PROCESSING SYSTEM TO FACILITATE THE COMMERCIAL SUPPORT ACTIVITIES ASSOCIATED WITH THE BUYING AND SELLING OF COMMODITY PRODUCTS

TECHNICAL FIELD OF THE INVENTION

The present invention pertains in general to electronic commerce and in particular to the trading of commodity products by use of a single contract and terms.

BACKGROUND OF THE INVENTION

An extremely large market exists for commodity products such as crude oil and refined light oils. There are many thousands of transactions per year for many billions of dollars of product. The traditional marketing of these products has been performed by traders who work for the buying and selling businesses by entering into a series of transactions for the purchase and sale of the crude oil or refined light oils. Since the transactions are repetitive, the parties typically use a previous contract and modify it for the current transaction. A document is either exchanged between the parties and marked-up, or each party maintains its own copy of the contract and enters the current transaction parameters based on telephone calls or faxes exchanged between the traders. A transaction may be finalized between traders without the formal execution of a signed document between them. In other cases, there is such a finalized document. Next, the scheduling of the product delivery is typically performed by schedulers who are employed by the buying and selling businesses. The scheduling is very complex because the availability of the product and the consumption of the product varies tremendously over time. Further, petroleum products are primarily transported through pipelines and the availability of the transportation facility cannot be planned far in advance. The optimum use of the transportation facilities requires a knowledge of all the transport that is required from all of the parties. The transaction is further complicated by the variation in the composition of the product such that the exact value of the product cannot at all times be predicted in advance. Thus, in many cases the volume of product and the composition of the product cannot be known until after the product has been delivered to the buyer.

The traditional system is time consuming and subject to mistakes and controversies. If the parties maintain separate records, there can be a later dispute over the actual terms of the agreement. The method of determining price can be ambiguous even though it was apparently agreed to by the traders at the initiation of the transaction. Although using the same words, the parties could actually be using different methodologies in calculating a price. Further, each of the, parties must update various incompatible systems within its own business with much of the data for the transaction, scheduling and settling. Thus, the same data must be repeatedly entered by different people within each of the businesses. This often leads to mistakes that cause controversy with the other party and require a great deal of time to resolve and can result in the business having to write off substantial sums of money due to the inability to prove or reconcile the transactions.

Electronic trading systems have been established for dealing in many kinds of products, including commodity products such as crude oil and refined light oils. These trading systems, however, are limited to bringing together parties who can establish the initial trading parameters for a transaction, but beyond that point the parties are subject to the usual difficulties of ambiguous terms and inexact knowledge until after the transaction has been completed. Electronic trading systems can assist businesses in making trades, but many of the inherent problems of traditional trading are still present.

In view of the above problems, there exists a need for a unified trading system that eliminates the ambiguities in agreements, tracks the transaction through to completion and mandates that the parties are in agreement on all the data at various stages of the transaction. Such a trading system can assist the industry in many ways by providing tracking information. It can further be used to provide data for assuring lines of credit to participating parties.

SUMMARY OF THE INVENTION

A selected embodiment of the present invention is a method for processing transactions through a computer network for supporting the trading of a commodity product between a plurality of parties. A standard contract is maintained in the system and all participating parties agree to abide by this standard contract. The parties to a particular transaction supply the information related to that transaction and create an instance of the standard contract which is then populated with this information. The instance of the contract is made available to the buyer and to the seller for their review and approval. Each of the parties must submit an approval to the system in order to continue the transaction process. Upon receiving the approval, each party has affirmed acceptance of the instance of the standard contract. The parties then provide scheduling information which may be entered by one or both of the buyer and seller. The system maintains a comprehensive product delivery schedule for all of the parties that are involved in the system. It generates a product delivery schedule for the particular transaction. The information in this schedule is derived from the instance of the standard contract and the scheduling information. The product delivery schedule is made available to the buyer and seller for approval. Upon acceptance of the product delivery schedule, the buyer and seller submit an affirmative approval to the system thereby affirming their acceptance of this stage of the transaction. The system next generates a product delivery schedule transmitted to a delivery asset, which may be a pipeline company. After the product has been delivered, the pipeline company provides a product delivery report that identifies the volume and composition of the product that was delivered. Upon receipt of this information, the system generates a product transaction invoice that is based at least on the product delivery report and the instance of the standard contract. This product transaction invoice is made available to both the buyer and seller for review. Both parties must approve this product transaction report and send confirmation of acceptance to the system. Upon receipt of this approval, the system generates payment statements to the buyer and seller based upon the approved product transaction invoice.

In a further aspect of the invention, certain tables of data are provided to supply information for the instance of the standard contract, the schedule, and the invoicing data.

In a further aspect, certain portions of the information stored in the system are available to all parties who are participating, other portions are available only to the participants in a particular transaction and certain proprietary information is stored for each of the parties in association with the instance of the contract and this information is available only to the parties that supplied the information.

In a still further aspect of the present invention, a financial institution can extend lines of credit to parties and then through monitoring the information available in the system, determine the extent that the line of credit has been utilized and prevent the party from exceeding this available line of credit. Sellers in such a system can be assured that payment will be made for the product purchased by the buyers.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
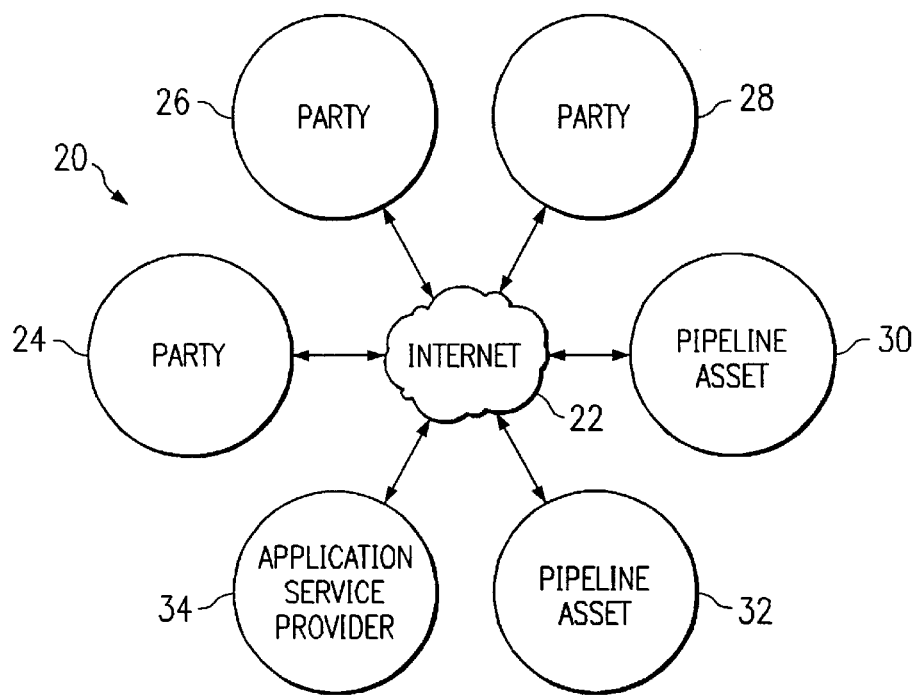
FIG. 1 is a schematic illustration of the principal entities involved with the present invention and the communication between these entities.

The present invention provides both a trading system and a support structure so that the trading can be integrated into the business operations of each of the parties participating in the trade. Further, it provides continuous and ongoing support for the business activities of the parties. Traditional electronic trading systems match up buyers and sellers for a particular product. Once agreement has been reached for the terms of a transaction, nothing further is required of the electronic trading system. However, certain types of products and transactions do not fit within this traditional structure for electronic commerce. In the field of commodity trading, particularly for crude oil, it is not sufficient to merely bring together a buyer and a seller for a particular transaction. Unlike products and services which can be clearly and precisely defined, the purchase and sale of a commodity such as crude oil, together with business integration, must be done in a different manner.

Transactions are often made for the purchase of crude oil before the oil itself is pumped from the ground, in contrast to purchasing a known and available product which is in inventory. The actual production and transportation of crude oil does not necessarily match the initially contemplated terms in a transaction. Due to many factors, it is possible that the requested quantity of product is simply not available or a particular production cycle may be more efficient with a greater quantity. Crude oil comes in a wide variety of grades together with graduations of these grades, and the value of the crude oil depends upon these characteristics. One primary characteristic of crude oil is its gravity, which is a measure of density. This measure is expressed in degrees.

Crude oil is classified according to its grade by a title which defines the type of crude oil typically produced in a region. For example, one benchmark measure of crude oil is termed West Texas Intermediate (WTI). The presence of sulfur in crude oil affects its value and is a defined class for many types of crude oil. For example, there is a West Texas Sour (WTS) which is a grade of oil that contains a greater amount of sulfur than WTI.

The price for a commodity can vary from day to day. In some cases the parties may agree on a fixed price for the commodity being purchased, but in other cases the parties may prefer to have a market valuation at the time of delivery or an average of such a valuation over a period of time. In such a circumstance, it is not possible to determine the final value of the transaction until it has been completed and the reference data for the price is available.

A significant problem involved in complex transactions is that the same information must be keyed into multiple non-connected processing systems. With the volume of information being keyed, there can be frequent errors which cause later problems that requires time and effort to resolve.

The present invention is described in reference to a trading and support system for the commodity crude oil. However, the present invention can be applied to the trading of any commodity, and is particularly applicable to the trading of such commodities which have variable or undefined parameters as described above.

The present invention is also applicable to light oil products such as gasoline, diesel and jet fuel produced by refineries, as well as natural gas and gas liquids. These products are likewise purchased and sold as commodities, scheduled for delivery and transported through pipelines as well as delivered by transport trucks.

Referring to FIG. 1, there is shown a network 20 which includes a communication fabric such as Internet 22 for providing communication in a conventional manner between a plurality of entities. Any communication fabric can be used, such as the public telephone system. The businesses which utilize the present system can be a large number of parties, which are represented by parties 24, 26 and 28. Each of these parties can be a buyer, a seller or both at the same or at different times. The commodity traded in the described example, crude oil, is transported by entities which are referred to as pipeline assets, such as 30 and 32. These are pipeline companies which transport crude oil for a published price that the parties must pay for the physical transportation of the product. The pipeline assets provide further services in addition to transportation. These include measuring the actual volume of product transferred, measuring the gravity, and specifying the grade for the product that is transported.

Further referring to FIG. 1, the trading operations of the present invention are performed through a computer system operated by an application service provider (ASP) 34. The various entities shown can communicate with each other through the Internet 22 and this communication can be made secure by use of conventional cryptographic or other security techniques.

In a general overview, as shown in FIG. 1, two parties, such as 24 and 26, determine through their traders the general terms for a transaction for the purchase and sale of a commodity, and this information is stored in the computer system provided by the application service provider 34. Before becoming members of the system which utilizes the application service provider 34, the parties agree upon a standard contract and agree to be bound by this contract whenever it is implemented through the application service provider 34. After the terms of a contract between parties 24 and 26 have been agreed upon, the parties must then determine a schedule for delivery of the product. This is done by a scheduler for each party. After a schedule has been established, a delivery report, also termed a nomination, is sent to one or more of the pipeline assets, such as 30. The selected pipeline companies provide transfer of the required product and measures both the quality and volume so the parties can reach a correct determination of payment for the delivered product. This information from the pipeline company, termed the "actuals," is provided via the Internet 22 back to the application service provider 34, and can also be provided to each of the parties.

A single copy of the transaction contract and the related information is maintained at the service provider 34. This contract is provided to the parties 24 and 26 so that both of the entities are working from a single document. This substantially reduces confusion and disputes as compared to a system in which each party maintains separate documentation of the transaction or if draft contracts are exchanged back and forth between the parties. After the physical transfer of the product has been completed, the application service provider 34 generates information for invoice clearing, and payables. The parties 24 and 26 are advised as to the payment obligations of the transaction so that they can make the appropriate financial payments and plan receipts of payment. The process of the present invention is defined in further detail below.

Figure 2:
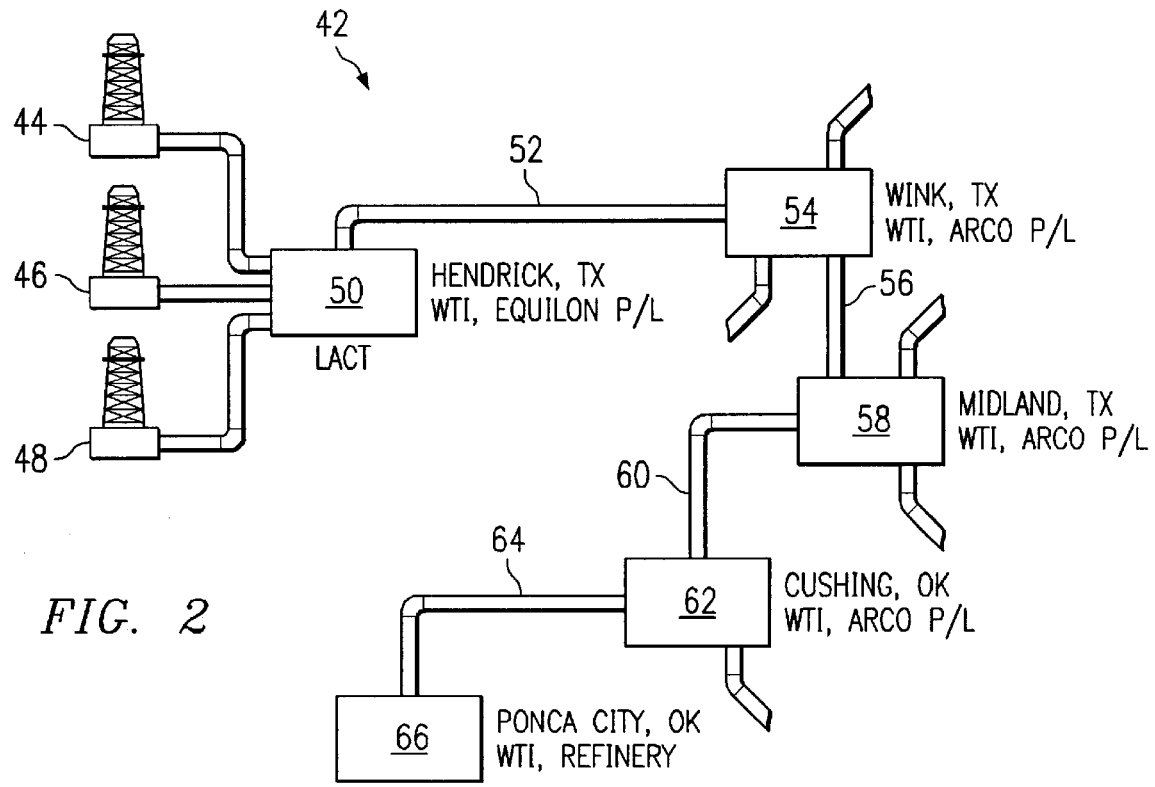
FIG. 2 is an illustration of crude oil transfer from producing wells through transfer stations to a refinery.

The purchase and sale of a commodity involves the transfer of that commodity between locations, from the seller to the buyer. A description of how such transfers occur for crude oil is helpful as background information for the present invention. Referring to FIG. 2, there is shown a distribution system 42 for transferring crude oil from producing wells 44, 46 and 48 through pipelines or other local transportation means to a transfer station 50. The station 50 is termed an LACT (Lease Automated Custody Transfer) facility which receives the oil produced by wells in the immediate vicinity. In the distribution system 42 shown in FIG. 2, there is shown a group of "stations." Each station is a transfer point that 10 is defined by a physical location, such as a city and state, the grade of product that it handles, and an identification of the owner of the transfer mechanism, such as a pipeline company. In FIG. 2 the station 50 is located at Hendrick, Tex. It handles WTI (West Texas Intermediate) crude oil which is transmitted through an Equilon pipeline (P/L).

Further referring to FIG. 2, the product collected at station 50 is transmitted through a pipeline 52 to a station 54. Station 54 is defined as Wink, Tex., handling WTI product by ARCO Pipeline. The transfer from station 54 is made through a pipeline 56 to a station 58. The station 58 is defined as Midland, Tex., WTI with the ARCO Pipeline Company. From Station 58, the crude oil is transferred through a pipeline 60 to a station 62. Station 62 is at Cushing, Okla., handling WTI by ARCO Pipeline.

From station 62, the product is transmitted through a pipeline 64 to a station 66 which comprises a refinery. The parameters of the station 66 are the location which is Ponca City, Okla., the product being WTI and the using entity defined as "refinery." FIG. 2 shows collection and transfer of the product which will be the subject of the transaction from the wells 44, 46 and 48, which are owned or leased by the seller, through a series of stations and ultimately to the refinery at station 66 for use by the buyer. Crude oil is transported as a fusible commodity product. The product received at the refinery may not be the same physical product pumped from the wells, but it has the parameters for the agreed transaction.

Figure 3:
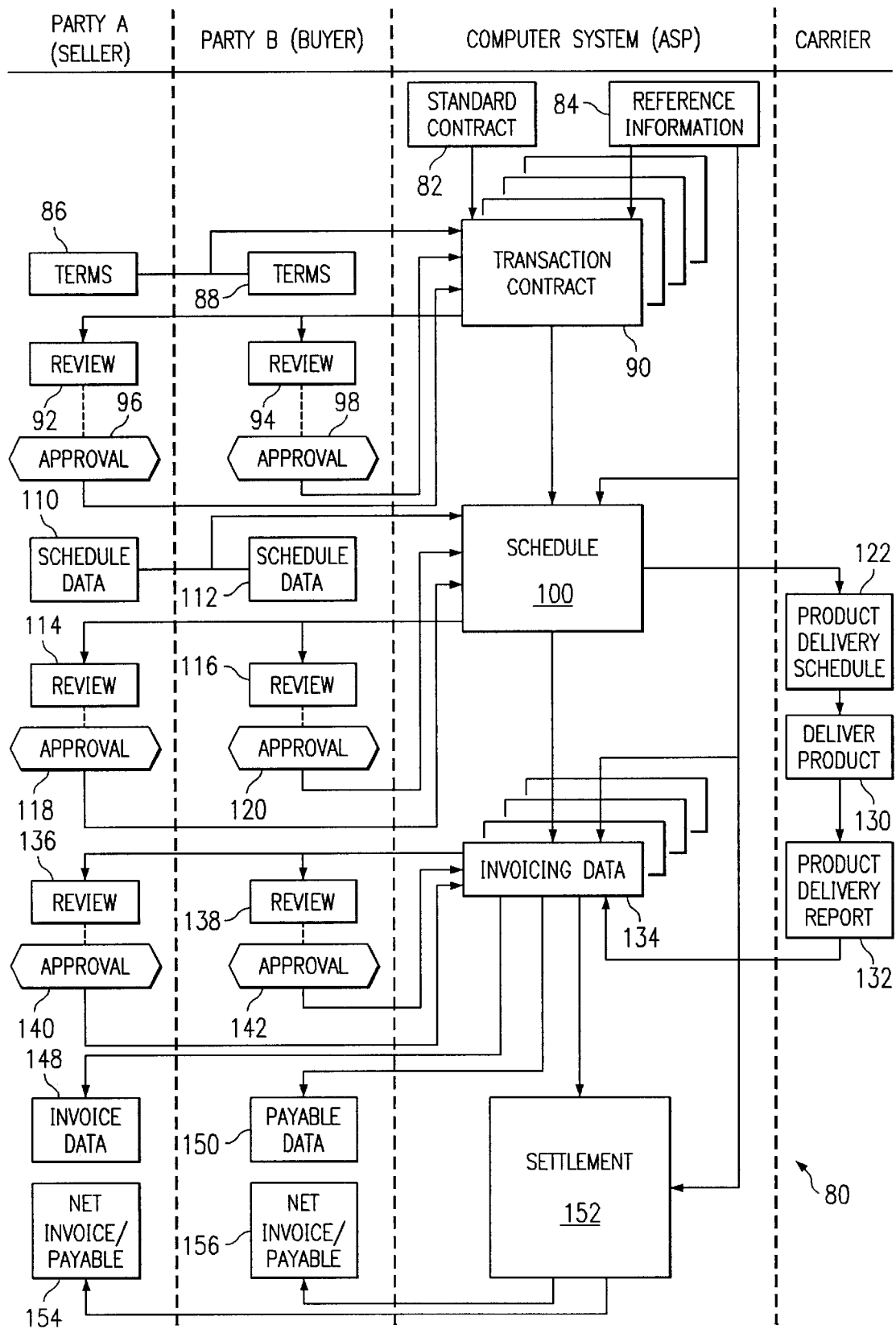
FIG. 3 is a time sequential block diagram of processing steps for parties, a to carrier and a computer system for illustrating the present invention.

The present invention is further described in reference to the block diagram 80 shown in FIG. 3 which represents a time sequence of operations that begin at the top of the page and continue generally toward the bottom of the page. The parties involved in a transaction are defined to be party A, which is the seller, and party B, which is the buyer. The computer system is installed at the application service provider 34 (see FIG. 1). The carrier is one or more of the pipeline companies, such as shown in FIG. 2.

The present invention is designed to be utilized by a large number of parties, both buyers and sellers, but only one transaction is described in detail in reference to diagram 80 in FIG. 3. Each of the parties that wishes to participate in the transaction system must previously register with the application service provider 34 or a recognized authority. As a part of this registration, each party agrees to be bound by contract provisions that it approves and to accept a standard contract 82, which it provided by the service provider 34. There is further pre-established certain reference information 84, which is posted by the service provider 34 and made available to all parties. Certain information taken from the reference information 84 is utilized at various stages in the transaction.

The reference information includes the following data:

1. Tariff—This is the price charged to convey crude oil between the various locations, such as shown in FIG. 2. This tariff is posted by each of the pipeline companies. The parties can determine transportation charges for their transaction based on this tariff.

2. Pricing—This is a posting of prices supplied by the parties, commercial services and markets. The parties to a transaction can specify either a fixed price or reference to pricing provided in the reference information. Examples include the Platts and Nymex indices.

3. B.A. Contact—This is business associate (B.A.) contact information which includes the name, address, and other contact information pertaining to each of the parties as well as specific contact information for individuals (traders and schedulers) who are conducting transactions for the named corporate parties.

4. Reference Data—the reference data includes place names, such as physical locations, commodity names with grades such as WTI, and a listing of all of the stations.

5. Stations—This is a listing of each of the stations and the specific information defined for each station, such as shown in FIG. 2. For example, station 62 is defined as being located at Cushing, Okla., handling product grade WTI, and with transmission controlled by ARGO Pipeline.

Returning to FIG. 3, parties A and B, which can be parties 24 and 26 as shown in FIG. 1, reach agreement on a set of terms for a transaction. This discussion could be through a communication channel that utilizes the Internet 22 or could be through direct telephone or fax communication. Contract terms 86 and 88 of the parties are input to a transaction contract 90. The preferred techniques for entering the terms are for one party to perform the actual entry after both parties have agreed upon the terms or from an Internet trading platform. The transaction contract 90 is an instance of the standard contract 82 which has been populated with the contract terms provided by the parties. A further approach to creating the transaction contract 90 is to import a set of agreed upon terms from a trading system, such as Houstonstreet.com where the parties have concluded the terms for an on-line transaction. Note that the system used by the service provider 34 is shown to have a large number of the transaction contracts 90 between other parties who subscribe to the transaction contract service.

| | |
|---|---|
| Product: | WTI |
| Quantity: | 30,000 barrels |
| Gravity: | deemed 40 degrees |
| Delivery: | November, 2000 |
| Pricing: | Party B posted price average for month of November, 2000 |
| Settlement Date: | Dec. 20, 2000 |

After the terms have been entered into the transaction contract 90 by the parties, a copy of the terms and contract is provided to each of the parties for reviews 92 and 94. The present invention utilizes a single contract document so that no confusion or misunderstanding can arise by each party maintaining its own copy of the contract and making modifications and changes during the discussion of the terms and other aspects of the transaction. The review can be done through the communication provided by the Internet 22. After party A has conducted review 92 and determined that all of the terms and the other aspects of the standard contract embodied in the transaction contract 90 are as desired, the party A can then "click" for an approval 96, which can be a box on a display screen. Likewise the party B studies the review 94 and if everything is acceptable, also "clicks" an approval 98. The approvals 96 and 98 are transmitted back to the application service provider 34 to establish approval of the particular transaction contract 90 by both of the parties A and B. This method of review and approval can be done very quickly so that the parties can enter into and commit to transactions without a lengthy paperwork process.

The transaction contract 90 is assigned a unique serial number to identify it within all of the contracts handled by the system.

The next step in the transaction procedure is to provide information for a schedule 100. The information used to produce the schedule 100 is derived from the transaction contract 90, the reference information 84, as well as schedule data inputs 110 and 112 from the parties. Discussions between the schedulers for the buyer and the seller can raise many issues pertaining to the schedule for delivery.

The seller may have particular problems in production and may not have product available until a later date, the buyer may need the product for consumption at a different date than originally considered. Outside factors such as the availability of carrier resources could come into play as well. The schedule data is preferably input by one of the parties, although it could be input by both parties, and becomes a part of the schedule 100. After all of the schedule information has been supplied, party A is provided with a review 114, party B with a review 116 of the completed schedule 100. The schedule 100 is a database for all of the transactions within the computer system of ASP 34. However, each party has access only to the information that pertains to that party.

The schedule 100 comprises a data base listing of each transfer activity for each of the stations used by the parties in the system for ASP 34. An example of the data within schedule 100 for the transaction contract 90 is as follows:

| Station: 54 | |
|---|---|
| Transport Asset: | ARCO P/L |
| Contract #: | 30246 |

| | |
|---|---|
| Company: | Coastal |
| Contract Type: | B/S |
| Grade: | WTI |
| Volume: | 30,000 bbls. |
| Source P/L: | Equilon P/L |
| Destination P/L: | ARCO P/L |
| Delivery Date: | Nov., 2000 |
| Station: 54 | |
| Transport Asset: | ARCO P/L |
| Contract #: | 30252 |
| Company: | Coastal |
| Contract Type: | B/S |
| Grade: | WTI |
| Volume: | 25,000 bbls. |
| Source P/L: | Equilon P/L |
| Destination P/L: | ARCO P/L |
| Delivery Date: | Dec., 2000 |
| Station: 58 | |
| Transport Asset: | ARCO P/L |
| Contract #: | 42,856 |
| Company: | Gulfmark |
| Contract Type: | O/P |
| Grade: | LCDS |
| Volume: | 10,000 bbls |
| Source P/L: | ARCO P/L |
| Destination P/L: | ARCO P/L |
| Delivery Date: | Nov., 2000 |
| Station: 62 | |
| Transport Asset: | ARCO P/L |
| Contract #: | 45,841 |
| Company: | Equiva |
| Contract Type: | T |
| Grade: | WTS |
| Volume: | 1,500 bbls |
| Source P/L: | ARCO P/L |
| Destination P/L: | Conoco P/L |
| Delivery Date: | Nov., 2000 |

The station information for the schedule 100 data base describes a transfer of custody of the product. The listing of "Company" is the seller of the product and is therefore the source of the product. The seller company must specify the source pipeline as set forth in the listing. Note that there may be multiple listings for a particular station for different contracts. Or, a single contract may have multiple listings for different deliveries over time. The contract type noted above for station 54 is B/S, which stands for Buy/Sell. This is a one-time purchase and sale agreement. The term "E" refers to an Evergreen" contract which is a recurring monthly transaction that continues until otherwise terminated. A "T"(or Term) contract is one in which deliveries are made over a specified term. The term "O/P" refers to an "outright purchase" which means a volume is bought from a counter party with no corresponding, offsetting sale (as in B/S). This is also O/S for "outright sale," and O/S for party A is an O/P for party B.

Note that certain portions of the schedule information are derived from the reference information 84. Other information is derived from terms that were agreed to in the transaction contract 90. Note also that a very large number of entries for the schedule 100 will be produced between the parties who are registered to utilize the ASP 34 system. After being provided with the reviews 114 and 116 of the current schedule 100 for the transaction contract 90, the parties A and B are presented with approvals 118 and 120. If party A approves the schedule 100 information, he clicks the approval 118, which is an acknowledgment of his agreement with the schedule 100 information he received. Party B likewise clicks the approval 120 to acknowledge his agreement with the schedule 100 information.

After the schedule 100 information for transportation contract 90 has been approved by both of the parties, it is sent to each required carrier, a pipeline company, as a product delivery schedule 122.

An example of the product delivery schedule 122 which is sent to one of the pipeline companies is as follows:

| Colonial Pipeline | (Nov., 2000) |
|---|---|
| Transaction #: | 32,455 |
| Source: | Conoco P/L |
| Recipient: | Colonial P/L |
| Volume: | 14,000 bbls. |
| Grade: | WTI |
| Transaction #: | 42,551 |
| Source: | Colonial P/L |
| Recipient: | Conoco P/L |
| Volume: | 30,000 bbls. |
| Grade: | WTI |
| Transaction #: | 43,451 |
| Source: | Colonial P/L |
| Recipient: | Exxon P/L |
| Volume: | 35,000 bbls. |
| Grade: | WTI |

After receipt of the product delivery schedule 122, each carrier provides the service of delivering the product set forth in block 130 and specified in the product delivery schedule 122. Upon completion of the delivery, the carrier asset prepares a product delivery report 132. An example of such a report (referred to as "pipeline ticket") for the transaction contract 90 is shown as follows:

| Colonial Pipeline | (Nov., 2000) |
|---|---|
| Transaction #: | 43,451 |
| Source: | Conoco P/L |
| Recipient: | Texaco P/L |
| Volume: | 34,880 bbls. |
| Grade: | WTI |
| Gravity: | 34° |

The above type of report is made for each transaction.

The product delivery report, which is also referred to as the "actuals" can also be delivered to the parties A and B.

Upon completion of the delivery, the computer system for ASP 34 produces invoicing data 134 for each transaction contract 90. The sources of information which produces the invoicing data includes the schedule 100 and selected data from the reference information 84 as well as the product delivery report 132. For the present example the invoicing data 134 can be as follows: .

| Contract #: | 35,451 |
|---|---|
| Buyer: | Conoco |
| Seller: | Plains Marketing |
| Delivery Date: | Nov., 2000 |
| Volume: | 34,880 bbls |
| Grade: | WTI |
| Gravity: | 340 |
| Calculated Sale Price: | $1,153,421.50 |

After the invoicing data 134 has been produced, it is transmitted to the parties A and B for respective reviews 136 and 138. Just as described above, there is a corresponding approval 140 for party A and an approval 142 for party B. After each party has made a review of the invoicing data, they can click on a predetermined field to confirm their approval of the invoicing data. Upon receiving the approval, the computer system for ASP 34 then transfers the finalized invoicing data to the parties A and B.

After both parties A and B have submitted the approval of the invoicing data, the ASP 34 computer system provides receivable data 148 to party A (the seller) and payable data 140 to the party B (the buyer). This information makes possible the preparation of an invoice by party A and the preparation to pay the invoice by party B. After the invoicing has been completed, there is a process of settlement 152. Settlement can be accomplished in any one of multiple ways. The preferred approach is to send a net receivable/payable 154 to party A and a net receivable/payable 156 to party B. The documentation for items 154 and 156 is based not only on the transaction contract 90, but includes all other outstanding transactions which involve parties A and B. These are for a net of all of the transactions in which these parties are involved. This may comprise a payment by A to B and to other parties, and in certain cases, A could be receiving payments from other parties. This likewise applies to B, so that the total settlement transactions between all the parties to the system is substantially reduced. Examples of receivable/payable data for the parties is as follows:

| Party A | |
|---|---|
| Receivable Party B - | $1,250,431.55 |
| Payable Party C - | [$35,000.45] |
| Payable Party D - | [$355,222.49] |
| Receivable Party G - | $1,435,221.65 |
| Receivable Party K - | $132,621.55 |
| Receivable Party R - | $695,421.31 |
| Party B | |
| Payable Party A - | [$1,250,431.55] |
| Payable Party G- | [$351,429.35] |
| Payable Party M - | [$2,365,231.50] |
| Receivable Party T - | $431,651.75 |

Figure 4:
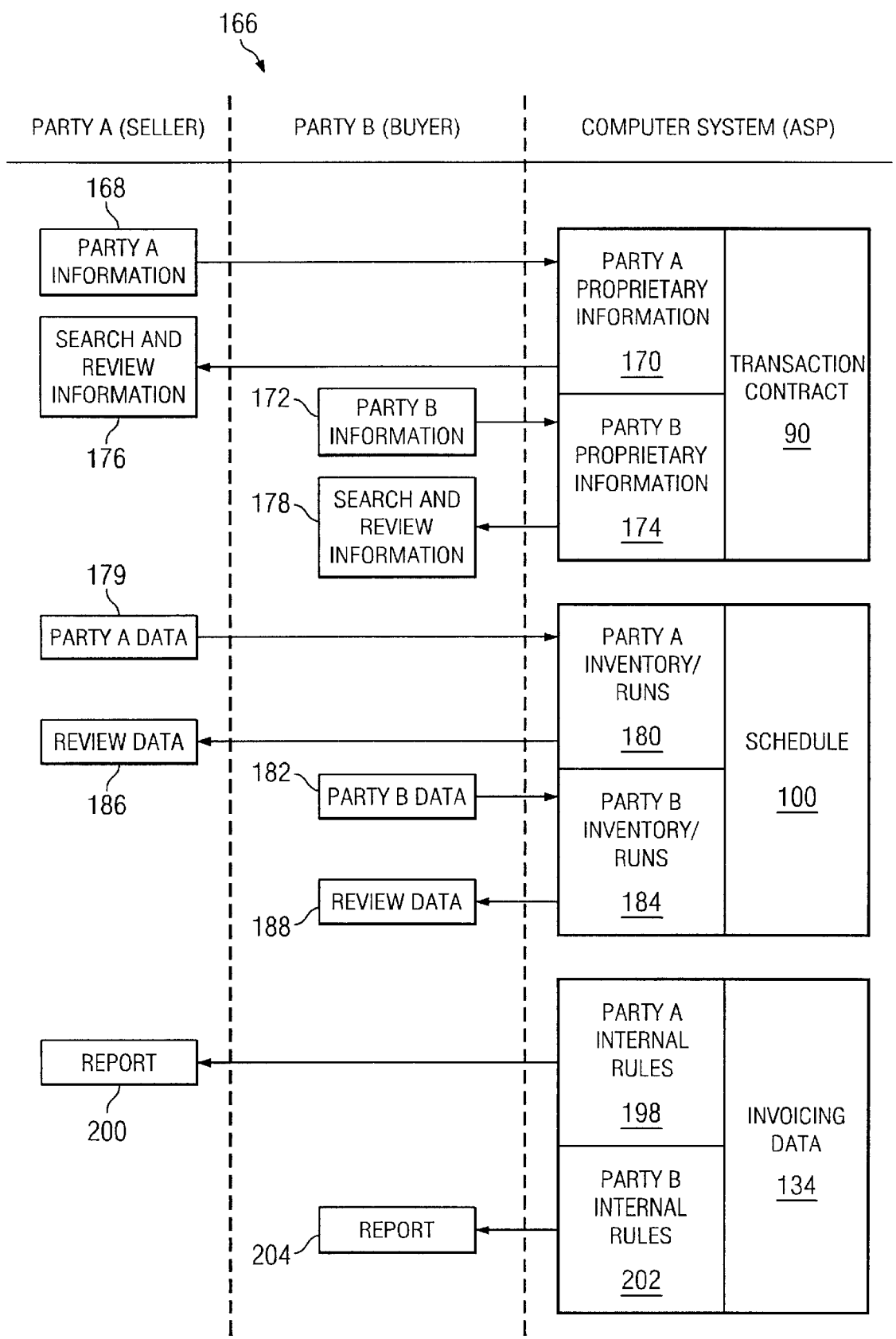
FIG. 4 is a block diagram illustrating additional aspects of transaction processing by the parties and computer system.

A still further aspect of the present invention is shown in FIG. 4 as block diagram 166. This is in reference to the same parties and computer system within the application service provider 34 as described in reference to FIG. 3. Each of the parties, such as A and B, is provided with a storage for confidential information pertaining to each principal aspect of the procedure described in reference to FIG. 3. Access to the information within the ASP 34 system is at three levels. The reference information 84 is available to all parties who subscribe to the system. The terms of a specific transaction contract, such as 90, are available only to the participating parties A and B. Private information, as further described in reference to FIG. 4, is limited to only the particular party which is associated with the information. For the transaction contract 90, party A has information 168 which is communicated to the computer system for storage as Party A Proprietary Information 170, in conjunction with the transaction contract 90. In a similar manner party B information 172 is submitted to the computer system for storage as Party B Proprietary Information 174.

Party A can search and review the proprietary information 170.as well as information in the transaction contract 90 through a search and review information process 176. In a similar manner, party B can access its proprietary information, as well as information to which it has access within the computer system, through its search and review information 178.

An example of proprietary information that a party may store is an identification of a particular use to be made of a product in a specific transaction. At a later time, the party can then search and locate all of the transactions which have that designated use. Another application is that a party can evaluate the profitability, both projected and final, for a particular transaction and at a later date access and review the profitability information to determine the relative profitability for all of the transactions in which the party is engaged, and that can identify the particular transactions which were the most profitable which can in turn be used as a guide for future transactions.

Continuing reference to FIG. 4, there is provided for the schedule 100 the ability of party A to store Party A data 178 within a specified file for Party A Inventory/Runs 180. This particular data can be used by a party to define the inventory associated with particular stations and the runs associated with usage at certain stations, such as a refinery. This information can be utilized by a party to determine future usage and therefore requirements for a product. The producing party can also utilize this information to evaluate its history and ability to deliver product in the future. Party B 182 Inventory/Runs is input to a Party B Inventory/Runs 184 for the purposes described above. Party A can use review data step 186, and likewise party B can use review data step 188 to search and evaluate the information within the proprietary data stored for the inventory/runs for that party.

A still further aspect of proprietary information is the inclusion of internal rules for a particular party related to the transaction process. Associated with the invoicing data 134 are Party A Internal Rules 198 which, under certain circumstances, generate a corresponding report 200. Party B has internal rules 202 which can generate a report 204. These can be internal accounting rules such as to limit how much an accountant can write off when actual numbers are different from planned numbers, trading rules which limit the amount or type of trades being conducted, and therefore create a report when such a rule is violated, and limitations on which employees are permitted to be involved in transactions. These reports can be provided directly to management of party A or party B so that appropriate actions can be taken when the internal rules are invoked.

Each of the instances of proprietary information above is maintained such that it is only available to the party that creates and uses the information.

Figure 5A:
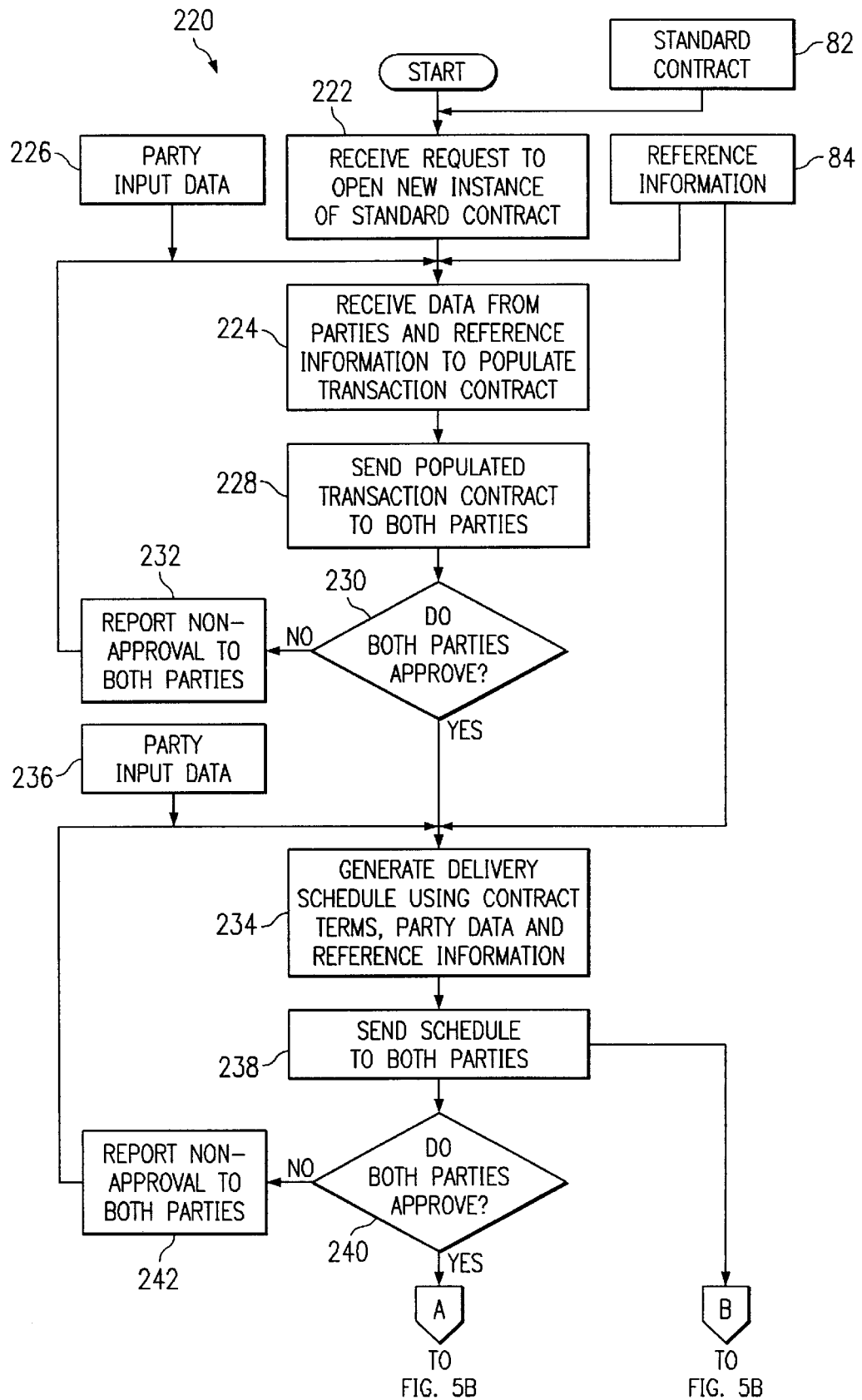
FIGS. 5A and 5B are flow diagrams illustrating functional steps performed for processing and supporting a transaction.
Figure 5B:
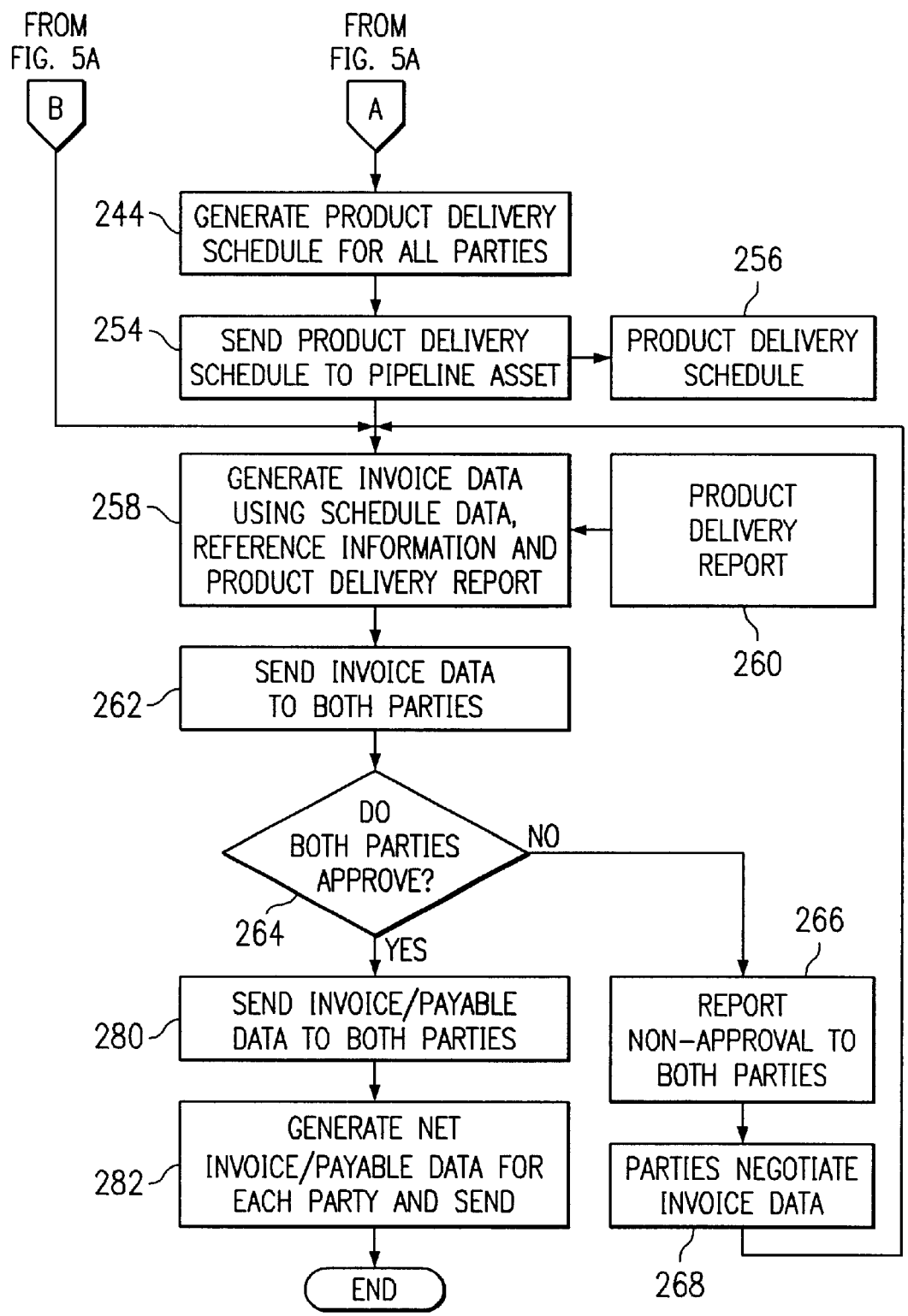

The transaction processing system of the present invention is further described in reference to a flow diagram 220 shown in FIGS. 5A and 5B. Reference will also be made to the corresponding aspects shown in FIG. 3. Following the start, at a first block 222, the ASP 34 computer system receives a request to open a new instance of the standard contract 82. This is for production of the transaction contract 90. Continuing to a block 224, party input data 226, such as terms 86 and 88 (FIG. 3), is received from the parties together with reference information 84 to populate the instance for transaction contract 90. At block 228 the transaction contract 90 is transmitted to both of the parties. At question block 230 a determination is made as to whether both parties have approved the transaction contract. This can be done as a default time or a non-approval response. If the answer is no, a transfer is made to a block 232 in which a report of the non-approval is sent to both of the parties. Following this step, return is made to block 224 to receive new input data from the parties. Typically, when this occurs the parties will have an off-line discussion to resolve differences that have arisen, or simply resolve any inadvertent problems that have been noted.

If the answer to question block 230 is yes, entry is made to block 234 to update the schedule 100 stored in the system based on the terms of contract 90, the party data and the reference information 84. The parties provide input data 236 to further develop the schedule. This can be modification or providing additional information. Following block 234, entry is made to block 238 in which the schedule is sent to both of the parties for all of the information that is relevant to those parties for transaction contract 90. At this point an inquiry is made in question block 240 to ascertain if both parties approve of the schedule 100 information that has been entered. If the response is negative, entry is made to a block 242 in which a report of the non-approval is provided to both of the parties. Control is then transferred back to block 234 in which the parties again provide input data 236 for resolving the discrepancies which caused at least one of the parties not to approve the schedule. If both parties do approve the schedule, entry is made to block 244 (FIG. 5B) to generate a product delivery schedule which will be provided to each of the relevant pipeline companies.

Continuing to block 254, the ASP 34 computer system prepares a product delivery schedule for each pipeline asset (pipeline company) and provides the product delivery schedule to the pipeline asset. The product delivery schedule lists the pipeline transfer activities that are performed for all of the parties who participate in the ASP 34 computer network system and is defined based on the stations that are managed by the particular pipeline asset.

After the products specified in the schedule have been delivered by the pipeline asset, a product delivery report 260 is prepared by the pipeline asset and submitted to the application software provider 34 computer system. In block 258 the computer system generates invoice data based on the schedule data, the reference information and the product delivery report which specifies the actual deliveries that were made in terms of quantity, grade, gravity and time of delivery.

In block 262 the invoice data is transmitted to both of the parties for the transaction relating to contract 90. The parties then have the opportunity to review this data and determine if it is accurate and represents the intentions of the contract.

At a question block 264, a determination is made if both parties approve the invoice data that they have received. If there is no approval, entry is made to block 266 and a report of such non-approval is sent to both parties, thereby raising a warning flag that there is a disagreement about the invoicing of the contract. At block 268, the parties can negotiate the invoice data to either change the information or to clarify the information that has been presented. The results of the negotiation in block 268 are then input to the block 258 for either modifying the invoice data or accepting the invoice data as it has previously been produced.

If the response at question block 264 is yes, that is both parties have approved the invoice, a resulting final invoice/payable data is sent to each of the parties in block 280. This is the particular information for the contract 90. At block 282, the computer system generates a net invoice/payable data for each of the parties and sends this information. It is likely that within the computer system operated by the ASP 34, each party will have multiple contracts that have been executed during the last billing time period. Rather than making payments for each individual transaction, there is produced a net invoice or payable for each of the parties so that each party need only close out a single invoice or payable with each other party within the network. By having the total invoice/payable data, each party is able to clear its accounting for each of the individual transactions.

After the net invoice/payable data has been transmitted, the parties can settle with the final payments through conventional means such as electronic transfer, or if preferred, the printing and mailing of a paper check.

A still further aspect of the present invention pertains to the provision of lines of credit to the participants in the transactions. Many sellers are not willing to commit to a transaction with a buyer unless that buyer has a line of credit for at least the amount of transaction to guarantee payment from the buyer. In the purchase and sale of crude oil, it is traditional that payment is not made until after the product is delivered to the buyer. Thus, if a buyer does not have a line of credit and is unable to make payment for the product, the seller will not be paid for the product that it has already provided. This situation inhibits sellers from entering into transactions and reduces the viability of the marketplace.

A buyer can obtain a letter of credit for a particular transaction and the amount of the transaction must be no more than the amount of credit available. However, buyers frequently engage in a large number of transactions. When a buyer has made payment for a particular transaction, his credit is then available for other transactions. However, it is very difficult and time consuming for the buyer to keep track of each transaction and to notify its bank when a particular transaction has been paid. It is also possible that a buyer could over utilize its line of credit and make multiple purchases with the representation that the same line of credit is available to secure all of these purchases. In such a situation, one or more sellers could end up without payment for their products.

A financial institution provides credit lines to buyers by use of the transaction system maintained by the ASP 34. The financial institution is provided with open access to the transaction contracts 90, the schedule 100, the invoicing data 134 as well as the settlement 152 data. The financial institution, which is preferably a bank, can extend a given line of credit to a particular party and that party can utilize the line of credit for multiple transactions and can roll the credit forward when earlier transactions are paid. The financial institution can monitor all of the activities of the party to whom it has extended the line of credit. By monitoring the activities, the financial institution can be assured that the buyer has not made purchases on credit that extend beyond the amount of the line of credit. In this situation, sellers can be assured that they will be paid for the sales thereby encouraging sellers to participate in the market. The financial institution can charge a fixed fee or a per unit of product fee which functions essentially as insurance to guarantee payment to the sellers.

An example of such a line of credit is as follows. Bank XYZ extends a letter of credit to party B, the buyer, in an amount of 10 million dollars. The sellers who participate in the computer network supported by the ASP 34 are made aware that the party B is supported by a line of credit from Bank XYZ. Party B enters into a transaction for the purchase of 2 million dollars worth of product from Party A.

Party B then enters into contracts of purchase with Party C for 3 million dollars, Party D for 3 million dollars and Party E for 1.5 million dollars. The financial institution XYZ is aware of each of these transactions by having access to the transaction contract and invoicing data. Should these amounts go beyond the line of credit, the financial institution can notify the buyer and direct that he make no further purchases until the outstanding balances are paid and he is back down within the allowable credit limit. The buyer can be advised of his running total, which in the present example is 9.5 million dollars. This leaves a credit line of 0.5 million dollars. Should Party B make the payment to Party C for 3.0 million dollars, then the Party D will then have an outstanding line of credit of 3.5 million dollars. All of the financial transactions are monitored by the financial institution by virtue of its access to the data within the computer network of the ASP 34.

The financial institution monitors the settlement 152 data to determine when a transaction has been paid. Thus, the financial institution can monitor the amount of commitment that the buyer Party B has made for all of its transactions. The sellers to Party B can be assured that payment will be made because the financial institution has assured payment to all sellers and the financial institution is responsible for monitoring the activities of its buyer.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What is claimed is:

1. A method for processing transactions through a computer network for supporting the trading of a commodity product between a plurality of parties, comprising the steps of:

maintaining a standard contract in a computer system, the standard contract including terms previously agreed upon by the parties and including terms by which the parties agreed to be bound, receiving a set of transaction terms, which include terms agreed upon by the parties for a transaction;

producing a transaction contract, which is an instance of the standard contract populated with the set of transaction terms, in response to transaction information received from a buyer and/or from a seller for a transaction, making said transaction contract available to said buyer and to said seller, receiving an approval command from said buyer and said seller for affirming acceptance of said transaction contract, receiving scheduling information from said buyer and/or seller, generating a product delivery schedule based on said transaction contract and said scheduling information, making said product delivery schedule available to said buyer and said seller, receiving an approval command from said buyer and said seller for affirming acceptance of sand product delivery schedule, sending product delivery information, which is based on said product delivery schedule, to at least one delivery asset, receiving a product delivery report from said delivery asset, generating a product transaction invoice based on at least said product delivery report and said transaction contract, making said product transaction invoice available to said buyer and said seller, receiving an approval command from said buyer and said seller for affirming acceptance of said product transaction invoice, and sending a payment statement to said buyer and seller wherein said payment statement is based on said product transaction invoice.

2. A method for processing transactions through a computer network for supporting the trading of a commodity product as recited in claim 1 including the steps of:
   maintaining a table of information which is available in an unrestricted manner to the users of said computer network, wherein said table of information contains data relating to transactions which can be conducted by said users for said commodity product, and
   using data from said table of information for generating said transaction contract and generating said product delivery schedule.

3. A method for processing transactions through a computer network for supporting the trading of a commodity product as recited in claim 1 including the steps of:
   receiving proprietary information from a one party who is either said buyer or said seller, and
   storing said proprietary information for said one party in conjunction with said transaction contract, wherein access to said proprietary information is available only to said one party.

4. A method for processing transactions through a computer network for supporting the trading of a commodity product as recited in claim 1 including the step of:
   denying access to said transaction contract, said product delivery schedule and said product transaction invoice to users of said computer network other than said buyer and said seller.

5. A method for processing transactions through a computer network for supporting the trading of a commodity product as recited in claim 1 including the step of:
   settling offset payments between said buyer and seller for multiple transactions conducted through said computer network.

6. A method for processing transactions through a computer network for supporting the trading of a commodity product as recited in claim 1 wherein said commodity is crude oil and said delivery asset is a pipeline company.

7. A method for processing transactions through a computer network for supporting the trading of a commodity product as recited in claim 1 wherein said commodity is a refined petrochemical product and said delivery asset is a pipeline company.

8. A method for processing transactions through a computer network for supporting the trading of a commodity product as recited in claim 1 including the step of:
   consolidating said product delivery information for a plurality of said transactions and providing respective consolidated product delivery reports to a plurality of said delivery assets.

9. A method for processing transactions through a computer network for supporting the trading of a commodity product as recited in claim 1 wherein said product delivery schedule is a part of a multi-transaction product delivery schedule for a plurality of users of said computer network who have entered into a plurality of said transactions.

10. A method for processing transactions through a computer network for supporting the trading of a commodity product as recited in claim 9 wherein said multi-transaction product delivery schedule is made available to one or more of said delivery assets, but each said user is limited only to information in said multi-transaction product delivery schedule which corresponds to a transaction pertaining to that user.

11. A method for processing transactions through a computer network for supporting the trading of a commodity product as recited in claim 1 wherein said commodity product is natural gas.

12. A method for processing transactions through a computer network for supporting the trading of a commodity product as recited in claim 1 wherein said commodity product is a natural gas liquid.

13. A method for processing transactions through a computer network for supporting the trading of a commodity product between a plurality of parties, comprising the steps of:
   maintaining a standard contract in a computer system, the standard contract including terms previously agreed upon by the parties and including terms by which the parties agreed to be bound,
   receiving specific transaction information from a buyer and/or a seller by said computer system for a product transaction between said buyer and seller, said transaction information including a set of transaction terms agreed upon by the parties for a transaction;
   creating in said computer system a transaction contract, which is a populated instance of said standard contract based on said transaction information received from said buyer and/or seller,
   making said transaction contract available to said buyer and/or said seller,
   generating a product delivery schedule based on said scheduling information,
   making said product delivery schedule available to said buyer and/or seller,
   receiving an approval command from said buyer and from said seller to affirm said transaction contract,
   maintaining a plurality of tables of information relating to said transactions in said computer system, wherein said tables of information are available to said plurality of parties,
   receiving scheduling information for said product transaction from one or more of said buyer and/or seller,
   receiving an approval command from said buyer and from said seller to affirm said scheduling information,
   generating a product delivery schedule for said product for said transaction based on said transaction contract, data from said tables of information, and said scheduling information,
   providing said product delivery schedule to a delivery asset,
   receiving a product delivery report from said delivery asset wherein said delivery asset provided transportation for said product,
   generating a product transaction invoice based on said product delivery report and data from said tables of information,
   receiving invoice information from one or more of said buyer and/or seller,
   receiving an approval command from said buyer and from said seller to affirm said product transaction invoice,
   generating invoice and payable information based on said product transaction invoice, and
   sending at least portions of said invoice and payable information to said buyer and to said seller.

14. A method for processing transactions through a computer network for supporting the trading of a commodity product as recited in claim 13 including the steps of:
   receiving proprietary information from a one party who is either said buyer or said seller,
   storing said proprietary information for said one party in conjunction with said transaction contract, wherein access to said proprietary information is available only to said one party.

15. A method for processing transactions through a computer network for supporting the trading of a commodity product as recited in claim 13 including the step of:
denying access to said transaction contract, said product delivery schedule and said product transaction invoice to users of said computer network other than said buyer and said seller.

16. A method for processing transactions through a computer network for supporting the trading of a commodity product as recited in claim 13 including the step of:
settling offset payments between said buyer and seller for multiple transactions conducted through said computer network.

17. A method for processing transactions through a computer network for supporting the trading of a commodity product as recited in claim 13 wherein said commodity is crude oil and said delivery asset is a pipeline company.

18. A method for processing transactions through a computer network for supporting the trading of a commodity product as recited in claim 13 wherein said commodity is a refined petrochemical product and said delivery asset is a pipeline company.

19. A method for processing transactions through a computer network for supporting the trading of a commodity product as recited in claim 13 including the step of:
consolidating said product delivery information for a plurality of said transactions and providing respective consolidated product delivery reports to a plurality of said delivery assets.

20. A method for processing transactions through a computer network for supporting the trading of a commodity product as recited in claim wherein said product delivery schedule is a part of a multi-transaction product delivery schedule for a plurality of users of said computer network who have entered into a plurality of said transactions.

21. A method for processing transactions through a computer network for supporting the trading of a commodity product as recited in claim 20 wherein said multi-transaction product delivery schedule is made available to one or more of said delivery assets, but each said user is limited only to information in said multi-transaction product delivery schedule which corresponds to a transaction pertaining to that user.

22. A method for processing transactions through a computer network for supporting the trading of a commodity product as recited in claim 13 in said commodity product is natural gas.

23. A method for processing transactions through a computer network for supporting the trading of a commodity product as recited in claim wherein said commodity product is a natural gas liquid.

24. A method for providing financial guarantees for transactions processed through a computer network to support the trading of a commodity product between a plurality of parties, comprising the steps of:
providing a given line of credit by a financial entity to a buyer who is registered to use the computer network for engaging in transactions for said product,
maintaining a standard contract in a computer system, the standard contract including terms previously agreed to by the parties and including terms by which the parties agreed to be bound,
receiving transaction information, which includes a set of transaction terms agreed upon by the parties for a transaction, from said buyer and/or a seller for producing a transaction contract, which is an instance of the standard contract populated with the set of transaction terms,
receiving an approval command from said buyer and said seller for affirming the transaction contract,
receiving scheduling information from said buyer and/or said seller to produce a product delivery schedule,
receiving an approval command from said buyer and said seller for approval of said product delivery schedule,
producing product delivery information for a delivery asset,
receiving a product delivery report from said delivery asset,
producing an invoice record based at least on said transaction contract and said product delivery report,
monitoring by said financial entity terms associated with each said transaction contract associated with said buyer,
comparing by said financial entity obligations in sum incurred by said buyer to said given line of credit,
monitoring payments made by said buyer for completion of said transactions, and determining by said financial entity the extent of credit available to said buyer based on said obligations incurred by said buyer, said payments made by said buyer and said given line of credit.

25. A method for providing financial guarantees for transactions processed through a computer network to support the trading of a commodity as recited in claim 24 including the step of advising said buyer when it has reached its limit of credit.

26. A method for providing financial guarantees for transactions processed through a computer network to support the trading of a commodity as recited in claim 24 including the step of extending lines of credit to multiple parties who participate in said network and advising sellers who participate in said network that said buyers have said lines of credit.

27. A method for providing financial guarantees for transactions processed through a computer network to support the trading of a commodity as recited in claim 24 wherein said commodity is crude oil and said delivery asset is a pipeline company.

28. A method for providing financial guarantees for transactions processed through a computer network to support the trading of a commodity as recited in claim 24 wherein said commodity is a refined petrochemical product and said delivery asset is a pipeline company.

29. A method for providing financial guarantees for transactions processed through a computer network to support the trading of a commodity as recited in claim 24 wherein said commodity is natural gas.

30. A method for providing financial guarantees for transactions processed through a computer network to support the trading of a commodity as recited in claim 24 wherein said commodity is a natural gas liquid.

* * * * *

UNITED STATES PATENT AND TRADEMARK OFFICE
CERTIFICATE OF CORRECTION

PATENT NO. : 6,868,401 B1
DATED : March 15, 2005
INVENTOR(S) : Kevin W. Carpenter It is certified that error appears in the above-identified patent and that said Letters Patent is hereby corrected as shown below:

Column 5,
Line 34, please delete "10"

Column 7,
Line 1, pleae add -- An example of the terms for the transaction contract 90 are as follows --

Column 9,
Line 60, please delete "340" and insert -- 34° --

Column 10,
Line 60, please delete "170." and insert -- 170 --

Column 14,
Line 49, please delete "sand" and insert -- said --

Column 17,
Line 34, please delete "claim" and insert -- claim 13 --

Signed and Sealed this

Twenty-sixth Day of July, 2005

JON W. DUDAS
*Director of the United States Patent and Trademark Office*